Nov. 11, 1941.　　　　B. WOODWARD　　　　2,262,521
CONTROL SYSTEM
Filed Aug. 27, 1940
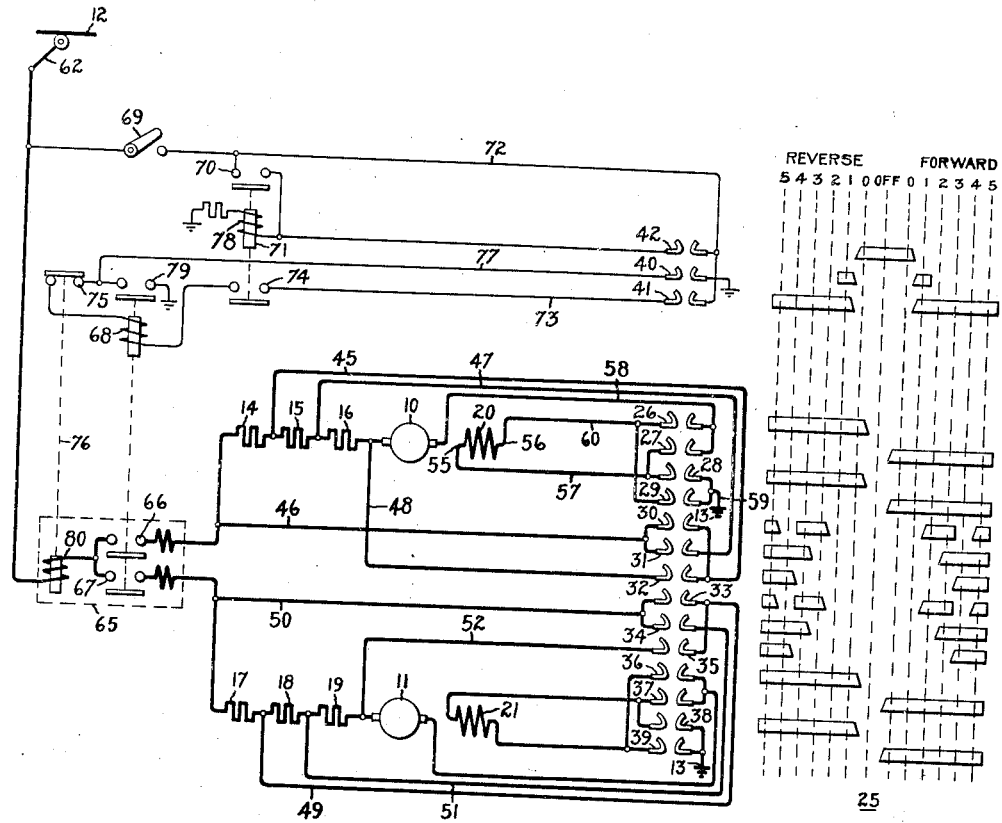
Inventor:
Bernard Woodward,
by Harry E. Dunham
His Attorney.

Patented Nov. 11, 1941

2,262,521

UNITED STATES PATENT OFFICE 2,262,521

CONTROL SYSTEM

Bernard Woodward, Erie, Pa., assignor to General Electric Company, a corporation of New York Application August 27, 1940, Serial No. 354,402

5 Claims. (Cl. 172—179)

My invention relates to control systems for multiple motor electric traction vehicles, and has for its object the provision of a new and improved power circuit arrangement for the traction motors of vehicles of this type.

It is a further object of my invention to provide an improved switching arrangement designed to prevent the generation of undesirable dynamic braking current.

It is well known to provide electrically driven vehicles with parallel connected motors or with a plurality of series connected groups of motors connected in parallel. Heretofore, it has been the practice to connect such traction motors to a source of supply in such a manner that when disconnected from the source the motors remained connected to each other in a loop circuit. As a result of this arrangement undesirable dynamic braking currents are frequently generated, and such currents interfere with the operation of the vehicle and may have a deleterious effect upon the windings and commutators of the traction motors and their torque transmitting members.

The manner in which my invention avoids the above shortcomings of prior arrangements will be more clearly understood from a consideration of the following description taken in conjunction with the accompanying drawing, in which the single figure is a diagrammatic representation of an electric vehicle control system embodying my invention.

Referring now to the drawing, I have shown two motors 10 and 11 connected in parallel between a source of supply 12 and a ground connection 13. Associated with the motor 10 I have shown a plurality of starting resistors 14, 15, and 16 adapted to be connected in various circuit relationships with the motor 10, as will be further described hereinafter. The motor 11 likewise has associated therewith a plurality of similar motor starting resistors 17, 18 and 19. A series field winding 20 is arranged to be connected for operation of the motor 10 in either direction, while a series field winding 21 may be similarly connected to the motor 11.

For the simultaneous control of the starting resistors 14, 15 and 16, and 17, 18 and 19, and of the series field windings 20, 21, I have shown a manually operated controller 25 provided with a plurality of cam switches 26 to 42 inclusive operated by cooperating cams on a controller drum. The cam switch 30 is connected to short circuit the starting resistor 14 through the wires 45 and 46. The cam switch 31 is connected to short circuit the starting resistors 14 and 15 through the wires 46 and 47. The cam switch 32 is connected to short circuit the starting resistors 15 and 16 through the wires 45 and 48. The switches 33, 34 and 35 are similarly connected to the starting resistors 17, 18 and 19 through the wires 49, 50, 51 and 52. The series field winding 20 is provided with two terminals 55 and 56. The terminal 55 may be connected to one terminal of the motor 10 through the cam switch 27 and the wires 57 and 58, while it may be connected to ground through the cam switch 28 and the wires 57 and 59. The terminal 56 of the field winding 20 may be connected to one terminal of the motor 10 through the cam switch 26 and the wires 60 and 58, while it may be connected to ground through the cam switch 29 and the wires 60 and 59. The cam switches 26, 27, 28, and 29 therefore constitute a reversing controller for the series field winding 20 associated with the motor 10. Through a group of similar connections the cam switches 36, 37, 38 and 39 constitute a reversing controller for the series field winding 21 associated with the motor 11.

The traction motors 10 and 11 are shown arranged for connection to the source of supply 12 through a trolley 62 and a double-pole line breaker 65. The motor 10 may be connected to the trolley 62 through the contacts 66 of the breaker, while the motor 11 may be connected to the trolley 62 through the contacts 67 of the breaker. The line breaker 65 is provided with an operating coil 68 which may be energized from the trolley 12 through a manually operated control switch 69, the wire 72, the cam switch 41, the wire 73, the contacts 74 of the relay 71, the operating coil 68, the normally closed contacts 75 of an over-current relay 76, the wire 77 and the cam switch 40 to ground.

In operation it may be assumed that the controller 25 is in its "off" position and that the manually operated control switch 69 is closed. In this position of the controller 25 the cam switch 42 is closed to complete an energizing circuit for the operating coil 78 of the undervoltage relay 71. The undervoltage relay 71 will therefore have picked up and completed a holding circuit for itself through its normally open contacts 70. If now the master controller 25 is moved from its off position to either of its zero positions, no change occurs in the positions of the switches 40, 41 and 42, but the proper cam switches controlling the field windings 20 and 21 are connected for operation of the motors in the selected direction. Proceeding now to the first operating position of the controller 25, it will be observed that no change occurs in the connections of the power circuits through the cam switches 26 to 39 inclusive, but that the cam switches 40 and 41 are closed while the cam switch 42 is opened. Through the cam switches 40 and 41 and a circuit previously traced energization is applied to the operating coil 68 of the line breaker 65. The line breaker 65 therefore picks up simultaneously to connect the motors 10 and 11 in parallel to the trolley 62 through the contacts 66 and 67 respectively of the breaker 65 and to complete a holding circuit for itself around the cam switch 40 through its normally open contact 79. As the controller is moved to its second operating position the cam switches 30 and 33 are closed to short circuit the resistances 14 and 17 respectively and the cam switch 40 is opened. In this second and all subsequent operating positions of controller 25 the cam switch 41 remains closed and the switches 40 and 42 remain open. As the accelerating cycle proceeds to the third operating position of the master controller the cam switches 31 and 34 are closed and the cam switches 30 and 33 remain closed. This results in connection of the motor 10 to the trolley 62 through only the resistance 16 and the connection of the motor 11 to the trolley 62 through only the resistance 19. If now the master controller 25 is moved to its fourth operating position the cam switches 30 and 33 are first opened and then the cam switches 32 and 35 are closed. The cam switches 31 and 34 remain closed. This results in connecting the motor 10 to the trolley 62 through the resistors 14, 15 and 16 in parallel and connecting the motor 11 to the trolley 62 through the resistors 17, 18 and 19 in parallel. In the fifth operating position of the master controller the cam switches 30 to 35 inclusive are all closed to connect the motors 10 and 11 directly to the trolley 62.

If at any time during the operation of the motors 10 and 11 the voltage of the source of supply should fall to an undesirably low value, the undervoltage relay 71 will disable the energizing circuit of the operating coil 68 at the contacts 74 of the relay 71. If a condition of overload should arise, an overload trip coil 80 of the overload relay 76 will disable the energizing circuit of the operating coil 68 at the contacts 75 of the relay 76. If for any other reason it is desired to disconnect the motors 10 and 11 from the trolley 62, the master controller 25 may be thrown to its "off" position to disable the energizing circuit of the operating coil 68 at the cam switch 41, or the control switch 69 may be opened to disable the circuit of the coil 68 at this point. Regardless of the manner in which the line breaker 65 is opened, the motors 10 and 11 will be disconnected from the trolley 62 at the contacts 66 and 67 respectively of the line breaker 65. Since the contacts 66 and 67 are connected together on the line side of these contacts, the motors 10 and 11 remain connected together only through their ground connection when the line breaker 65 is open. It will now be apparent that no undesirable circulating currents may be generated in the motors 10 and 11 when the line breaker 65 is in its open position.

It will be understood, of course, by those skilled in the art that my invention is not limited to the use of only two motors 10 and 11 connected in parallel, but that it may be applied equally well where series connected groups of any number of traction motors are connected in parallel. It will likewise be understood that my invention is equally applicable to any desired number of parallel circuits containing any desired number of series connected groups of motors.

While I have shown one form of my invention by way of illustration, it will be well understood by those in the art that I do not wish to be limited thereto, since many modifications are possible, and I, therefore, intend by the appended claims to cover all such modifications as fall within the true spirit and scope of my invention.

What I claim as new and desire to secure by Letters Patent of the United States is:

1. In a traction motor system for an electrically driven vehicle, a plurality of electric traction motors, electrical connections for connecting a first terminal of each of said motors to the same side of an electric supply source, a plurality of line contactors for connecting respectively the other terminals of said motors to the other side of the supply source whereby said motors are connected in parallel with each other to said supply source and each of said motors is connected in a closed loop circuit including another of said motors, mechanical means connecting said contactors together for simultaneous operation and electrically operated means for opening said contactors while the first terminals of said motors remain connected to said same side of said supply source thereby to disconnect the other terminals of said motors from the other side of said supply source and disconnect said terminals from each other to disable the loop circuit for each of said motors.

2. In a traction motor system for an electrically driven vehicle, a plurality of electric traction motors, manually operable means for simultaneously connecting a first terminal of each of said motors to the same side of an electric supply source, switching means comprising a plurality of operatively interdependent line contacts arranged respectively to connect the other terminals of said motors to the other side of said supply source whereby said motors are connected in parallel with each other to said supply source and simultaneously each of said motors is connected in a closed loop circuit including another of said motors, and electrical means for operating said switching means to open said line contacts while the first terminals of said motors remain connected to said same side of said supply source thereby to disconnect the other terminals of said motors from the other side of said supply source and disconnect said other terminals from each other to disable the loop circuit for each of said motors, whereby whenever said motors are deenergized said loop circuit is disabled.

3. In a traction motor system for an electrically driven vehicle, a plurality of electric traction motors having series field windings, manually operable controller means arranged to connect said series field windings in circuit with their respective motors and simultaneously to connect a first terminal of each of said motors to the same side of an electric supply source, a single switching mechanism having a plurality of operatively interdependent contacts arranged respectively to connect the other terminals of said motors to the other side of said supply source whereby said motors are connected in parallel with each other to said source of supply and simultaneously each of said motors is connected in a closed loop circuit including another of said motors, electromagnetic operating means for said switching mechanism, and means associated with said controller for controlling said operating means, whereby when said interdependent contacts are opened while the first terminals of said motors remain connected to said same side of said supply source said motors are deenergized and disconnected from each other to disable the loop circuit for each of said motors.

4. In a control system for an electrically driven vehicle, a plurality of electric traction motors, a permanently grounded manually operable controller, contact means associated with said controller and arranged to connect a first terminal of each of said motors to ground through said controller, single switching means comprising a plurality of operatively interdependent contacts arranged respectively to connect the other terminal of each of said motors to one side of an electric supply source thereby to connect said motors in parallel with each other to said source of supply and simultaneously to connect each of said motors in a closed loop circuit including another of said motors, and second contact means associated with said controller and arranged to control said switching means, whereby when said interdependent contacts are opened while said first terminals of said motors remain connected to ground said motors are deenergized and disconnected from each other to disable the loop circuit for each of said motors.

5. In a control system for an electrically driven vehicle, a plurality of electric traction motors having series field windings, a permanently grounded manually operable controller having contacts for connecting said series field windings in circuit with their respective motors and simultaneously connecting a first terminal of each of said motors to ground, a single switching mechanism having a plurality of operatively interdependent contacts arranged respectively to connect the other terminal of each of said motors to an electric supply source and simultaneously to complete a loop circuit including said motors, and means for operating said switching mechanism to open said contacts while said first terminals of said motors remain connected to ground thereby to disconnect said other terminals of said motors from said source of electric supply and to disconnect said other terminals from each other to disable said loop circuit.

BERNARD WOODWARD.